United States Patent
Holbrook et al.

(10) Patent No.: US 9,677,438 B2
(45) Date of Patent: Jun. 13, 2017

(54) EXHAUST FLOW VALVE WITH REVRUMBLE FEATURE

(71) Applicant: GM Global Technology Operations LLC, Detroit, MI (US)

(72) Inventors: Jacob A. Holbrook, Ypsilanti, MI (US); Roger C. Barlow, Jr., Brighton, MI (US); Frank C. Valeri, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/886,406

(22) Filed: Oct. 19, 2015

(65) Prior Publication Data

US 2017/0107876 A1    Apr. 20, 2017

(51) Int. Cl.
*F01N 1/16* (2006.01)
*F01N 1/18* (2006.01)

(52) U.S. Cl.
CPC .............. *F01N 1/168* (2013.01); *F01N 1/16* (2013.01); *F01N 1/18* (2013.01); *F01N 2390/02* (2013.01)

(58) Field of Classification Search
CPC .............. F01N 1/16; F01N 1/168; F01N 1/18
USPC .......... 123/323; 60/273, 274; 181/227, 228, 181/236, 237
See application file for complete search history.

(56) References Cited

U.S. PATENT DOCUMENTS

| | | | | |
|---|---|---|---|---|
| 7,401,592 B2* | 7/2008 | Willats | .................... | F01N 13/08 |
| | | | | 123/190.14 |
| 7,913,810 B2* | 3/2011 | Meneely | .................. | F01N 1/02 |
| | | | | 181/237 |
| 8,364,379 B2* | 1/2013 | Johnson | .................... | F02D 9/04 |
| | | | | 123/323 |
| 8,365,522 B2* | 2/2013 | Abram | ...................... | F01N 1/16 |
| | | | | 181/253 |
| 8,857,561 B2* | 10/2014 | Abram | .................... | F01N 1/065 |
| | | | | 181/237 |
| 8,905,187 B2* | 12/2014 | Schorn | ...................... | F01N 1/08 |
| | | | | 181/227 |
| 2004/0261404 A1* | 12/2004 | Vignassa | ................. | F01N 1/089 |
| | | | | 60/324 |
| 2005/0067219 A1* | 3/2005 | Albertson | ................. | F01N 1/02 |
| | | | | 181/240 |
| 2007/0182525 A1* | 8/2007 | McCarthy | .................. | H04S 7/00 |
| | | | | 340/425.5 |
| 2007/0227807 A1* | 10/2007 | Meneely | ................... | F01N 1/02 |
| | | | | 181/237 |

(Continued)

*Primary Examiner* — Erick Solis

(57) ABSTRACT

A system in a vehicle including at least one sound quality valve arranged in an exhaust system of the vehicle includes a sound quality valve control module that determines whether one or more criteria for opening the sound quality valve are met, selectively actuates the sound quality valve to an open position if the one or more criteria for opening the sound quality valve are met, and maintains the sound quality valve in a closed position if a required one of the one or more criteria for opening the sound quality valve is not met. A downshift detection module determines whether aggressive driving behavior is detected. If the aggressive driving behavior is detected, the sound quality valve control module actuates the sound quality valve to the open position regardless of whether the required one of the one or more criteria for opening the sound quality valve is met.

18 Claims, 3 Drawing Sheets

(56) References Cited

U.S. PATENT DOCUMENTS

| | | | |
|---|---|---|---|
| 2009/0319160 A1* | 12/2009 | Callahan | F02D 9/04 |
| | | | 701/111 |
| 2010/0043398 A1* | 2/2010 | Abram | F01N 1/16 |
| | | | 60/273 |
| 2011/0079463 A1* | 4/2011 | Scheetz | F01N 1/02 |
| | | | 181/250 |
| 2015/0053500 A1* | 2/2015 | Park | F01N 1/166 |
| | | | 181/241 |
| 2015/0275736 A1* | 10/2015 | Bucci | F01N 11/00 |
| | | | 60/273 |

* cited by examiner

EXHAUST FLOW VALVE WITH REVRUMBLE FEATURE

FIELD

The present disclosure relates to systems and methods for enhancing engine sound quality.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Automotive vehicles, especially performance automotive vehicles, may implement one or more sound quality valves (e.g., exhaust flow valves) and/or other engine sound enhancement features. For example, a vehicle may include the sound quality valves at one or more locations throughout an exhaust system (e.g., at an opening of an exhaust tip). The valves may be actuated (e.g., closed, partially or fully opened, etc.) to adjust the magnitude, frequency, tone, etc. of the sound generated by the engine through the exhaust system.

The sound quality valves may be selectively actuated based on various inputs, including, but not limited to, a selected engine or performance mode. For example, the selected mode may correspond to one or more modes associated with enhanced performance (e.g., a track or sport mode), and therefore further associated with a louder or more aggressive engine sound. Conversely, the selected mode may correspond to one or more modes associated with a quieter or less aggressive engine sound (e.g., an economy, city, stealth, or touring mode).

SUMMARY

A system in a vehicle including at least one sound quality valve arranged in an exhaust system of the vehicle includes a sound quality valve control module that determines whether one or more criteria for opening the sound quality valve are met, selectively actuates the sound quality valve to an open position if the one or more criteria for opening the sound quality valve are met, and maintains the sound quality valve in a closed position if a required one of the one or more criteria for opening the sound quality valve is not met. A downshift detection module determines whether aggressive driving behavior is detected. If the aggressive driving behavior is detected, the sound quality valve control module actuates the sound quality valve to the open position regardless of whether the required one of the one or more criteria for opening the sound quality valve is met.

A method of operating a vehicle including at least one sound quality valve arranged in an exhaust system of the vehicle includes determining whether one or more criteria for opening the sound quality valve are met, selectively actuating the sound quality valve to an open position if the one or more criteria for opening the sound quality valve are met, maintaining the sound quality valve in a closed position if a required one of the one or more criteria for opening the sound quality valve is not met, and determining whether aggressive driving behavior is detected. The method further includes, if the aggressive driving behavior is detected, actuating the sound quality valve to the open position regardless of whether the required one of the one or more criteria for opening the sound quality valve is met.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

In a vehicle including sound quality valves, the sound quality valves may be selectively actuated according to various inputs and parameters, including, but not limited to, a selected engine or performance mode, requested torque, pedal position, shift direction (i.e., upshift or downshift), and user inputs (e.g., selected and/or stored user preferences). For example, various combinations of the inputs and parameters may determine when the sound quality valves are opened and closed.

In some circumstances, one parameter may contradict another parameter. For example, the pedal position or requested torque may correspond to the sound quality values being opened while the selected mode may correspond to the sound quality valves being closed. Accordingly, a user input may indicate that the sound quality valves should be opened in certain conditions but other parameters may cause the sound quality valves to remain closed during those conditions.

In one example, a user input or other parameter may indicate that the sound quality valves should be opened in situations where engine speed matching is performed for a downshift (e.g., using a RevMatch feature). For example, in some vehicles (e.g., vehicles having manual transmissions and vehicles including automatic transmissions (including, but not limited to, dual clutch transmissions, paddle shift transmissions, etc.)), an engine speed may be increased during the downshift prior to engaging the target transmission gear. In this manner, the engine speed is matched to an engine speed as predicted with the (lower) target transmission gear engaged.

Engine speed matching (e.g., whether initiated by the user or performed by the vehicle) may be indicative of a downshift. In particular, engine speed matching may be indicative of an aggressive downshift corresponding to a significant increase in engine speed, requested torque, etc. Accordingly, when engine speed matching is performed, it may be desirable to open the sound quality valves during the corresponding downshift to permit a louder or more aggressive engine sound. Engine sound enhancement systems and methods according to the principles of the present disclosure open the sound quality valves in response to engine speed matching or other indicators of a downshift (e.g., aggressive driving indicators) regardless of other inputs or parameters that may correspond to closing the sound quality valves.

Figure 1:
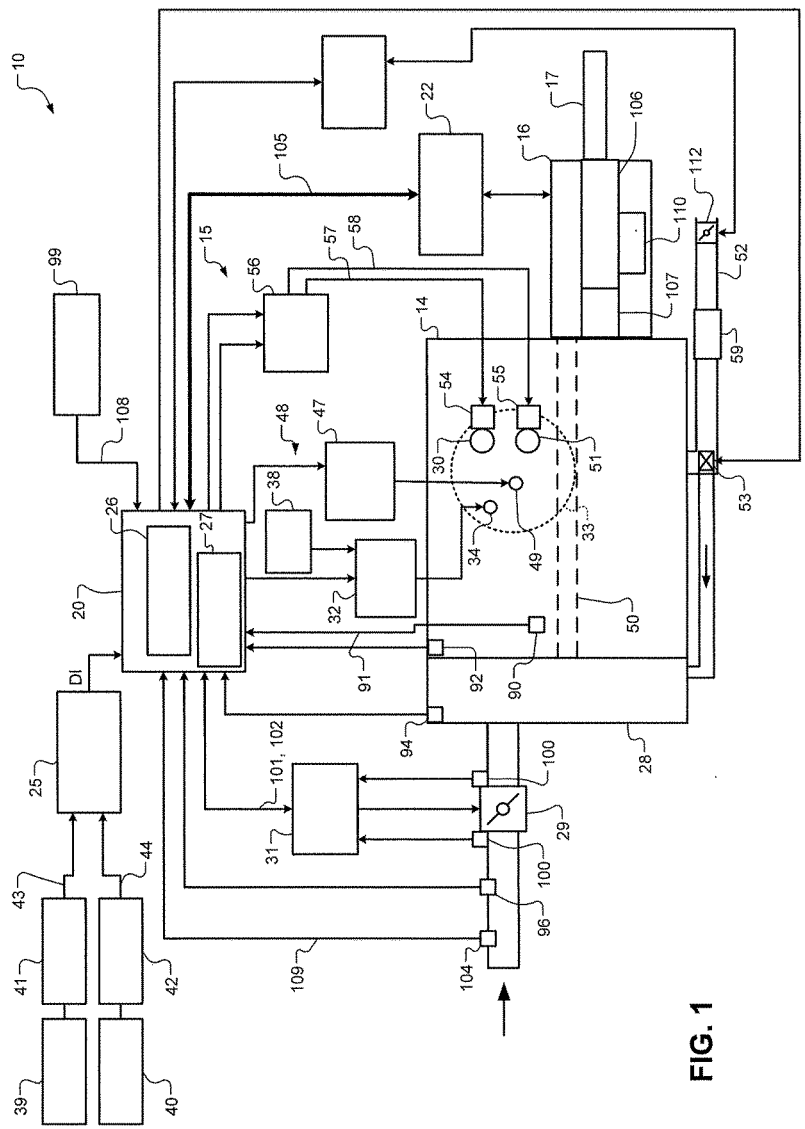
FIG. 1 is a functional block diagram of an example vehicle system according to the principles of the present disclosure.

In FIG. 1, a vehicle system 10 includes an internal combustion engine (ICE) 14 with a valve actuation system 15 and a transmission system 16 that are controlled respectively by an engine control module (ECM) 20 and a transmission control module (TCM) 22. The ECM 20 includes an engine sound enhancement (ESE) module 26 and, in some embodiments (e.g., in manual transmission vehicles), an optional engine speed matching (ESM) module 27. The ESE module 26 and the engine speed matching module 27 may be part of the ECM 20, part of another control module of the vehicle system 10, and/or may be separate control modules that communicate with the ECM 20. In various implementations, the ECM 20, the TCM 22, and other control modules of the vehicle system 10 may be integrated into one or more modules.

While a spark ignition direct injection (SIDI) type engine is described herein, the present disclosure is applicable to other types of torque producers, such as gasoline type engines, gaseous fuel type engines, port fuel injection engines, diesel type engines, propane type engines, and hybrid type engines. The ICE 14 combusts an air/fuel mixture to produce drive torque for a vehicle based on information from a driver input module 25 (e.g., driver input signal DI) and other information described below. The ICE 14 may be a 4-stroke engine where the piston is cycled iteratively through intake, compression, power/expansion and compression strokes.

In operation, air is drawn into an intake manifold 28 of the ICE 14 through a throttle valve 29 and/or a one or more intake valve(s) 30 of the valve actuation system 15. The ECM 20 commands a throttle actuator module 31 to regulate opening of the throttle valve 29 to control the amount of air drawn into the intake manifold 28 based on, for example, information from the driver input module 25. The vehicle system 10 may not include the throttle valve 29 and the throttle actuator module 31. The ECM 20 commands a fuel actuator module 32 to control the amount of fuel injected into the intake manifold 28, intake runner, and/or a cylinder 33, via for example a fuel injector 34. Fuel injectors of the ICE 14 are identified as 34.

Fuel may be pumped to the fuel injector 34 via one or more fuel pumps, such as the fuel pump 38. The fuel pumps may include a high-pressure fuel pump and a low-pressure fuel pump, where the fuel pump 38 is the high-pressure fuel pump and provides fuel at a high-pressure to a fuel rail (shown in FIG. 3) of the fuel injector 34. Although a single cylinder is shown, the ICE 14 may include any number of cylinders with corresponding injectors and intake and exhaust valves.

The driver input module 25 may receive signals from, for example, sensors of a brake actuator 39 (e.g., brake pedal) and/or an accelerator 40 (e.g., accelerator pedal). The sensors may include a brake sensor 41 and an accelerator pedal sensor 42. The driver input signal DI may include a brake pedal signal BRK 43 and an accelerator pedal signal PEDAL 44. Air from the intake manifold 28 is drawn into the cylinder 33 through an intake valve 30.

The ECM 20 controls the amount of fuel injected into the intake manifold 28 and/or the cylinder 33. The injected fuel mixes with the air and creates the air/fuel mixture in the cylinder 33. A piston (not shown) within the cylinder 33 compresses the air/fuel mixture. Based upon a signal from the ECM 20, a spark actuator module 47 of an ignition system 48 energizes a spark plug 49 in the cylinder 33, which ignites the air/fuel mixture.

The combustion of the air/fuel mixture drives the piston down, thereby driving a rotating crankshaft 50. The piston then begins moving up again and expels the byproducts of combustion through an exhaust valve 51 of the valve actuation system 15. The byproducts of combustion are exhausted from the vehicle via an exhaust system 52. The exhaust system 52 may include an exhaust gas recirculation (EGR) valve 53, which may be used to recirculate exhaust gas from the exhaust system 52 back to the intake manifold 28 and/or cylinders of the ICE 14 (e.g., the cylinder 33). Exhaust gas passes through a catalyst 59 prior to being released to the atmosphere.

The intake and exhaust valves 30, 51 may be electronically controlled by a valve actuator module 56 via valve actuators 54, 55. The valve actuator module 56 may generate valve control signals VCS1 57, VCS2 58 to control position of the valves 30, 51. The valve actuators 54, 55 may include solenoids. The ECM 20 may control individual position of each of the intake and exhaust valves 30, 51 during autostart and autostop modes.

The vehicle system 10 may detect the position and measure the speed of the crankshaft 50 (engine speed) using one or more engine position and/or speed sensor(s) 90. In one implementation, a single sensor with a single sensing element is used to detect position and speed of the crankshaft 50. The speed sensor 90 may generate a crankshaft signal CRK 91. Temperature of the ICE 14 may be measured using an engine coolant or oil temperature (ECT) sensor 92.

The pressure within the intake manifold 28 may be measured using a manifold absolute pressure (MAP) sensor 94. In various implementations, engine vacuum may be measured, where engine vacuum is the difference between ambient air pressure and the pressure within the intake manifold 28. The mass of air flowing into the intake manifold 28 may be measured using a mass air flow (MAF) sensor 96. The ECM 20 determines cylinder fresh air charge primarily from the MAF sensor 96 and calculates a desired fuel mass using open loop, closed loop and transient fueling algorithms. Fuel injector characterization functions convert the desired fuel mass into an injector on time, which is executed by fuel injector outputs of the ECM 20.

Although the vehicle system is shown as including the throttle valve 29 and a throttle actuator module 31, the flow of air into the cylinder 33, may be controlled via the valve actuator module 56. For example, the valve actuator module 56 may adjust position of the intake valve 30 to adjust air flow into the cylinder 33, instead of or in addition to the throttle actuator module 31 adjusting position of the throttle valve 29. The valve actuator module 56 may be used to control air into the cylinder 33 when the throttle valve 29 is not included in the vehicle system 10.

The throttle actuator module 31 may monitor position of the throttle valve 29 using one or more throttle position sensors (TPS) 100. Throttle position signals THR1 101 and THR2 102 may be transmitted between the throttle actuator module 31 and the ECM 20. The first throttle position signal THR1 101 may indicate to the ECM 20 the position of the throttle valve 29. The second throttle position signal THR2 102 may be transmitted from the ECM 20 to the throttle actuator module 31 to command a throttle valve position. In one implementation, the signals TPS1, TPS2 from the sensors 100 may be used to determine a redundant, single throttle position. Each of the signals TPS1, TPS2 from the sensors 100 may be used to perform diagnostics on the other one of the signals TPS1, TPS2. Vehicle speed may be determined via a vehicle speed sensor 99 to generate a vehicle speed signal Vspd 108.

The control modules of the vehicle system 10 may communicate with each other via serial and/or parallel connections and/or via a control area network (CAN) 105. For example, the ECM 20 may communicate with the TCM 22 to coordinate shifting gears in the transmission system 16 and adjust torque during a gear shift.

The transmission system 16 includes a transmission 106 and a torque converter 107 and may include an auxiliary pump 110. The auxiliary pump 110 is external to the transmission 106 and maintains fluid pressure within the transmission 106 to maintain engagement of gear(s) and/or clutch(es). For example, a first gear may be held in an engaged state during a neutral idle mode using the auxiliary pump 110. Devices other than the auxiliary pump 110 may be used to maintain pressure, such as an accumulator.

The ESE module 26 implements engine sound enhancement systems and methods according to the principles of the present disclosure. In particular, the ESE module 26 selectively actuates one or more sound quality valves 112 in response to an indication that a downshift is being performed regardless of other sound quality valve control parameters indicating that that the sound quality valves 112 should remain closed (e.g., sound quality valve control parameters corresponding to a current sound quality valve control scheme). For example, the ESE module 26 determines whether engine sound enhancement is enabled, determines whether one or more criteria for performing engine sound enhancement are met, determines whether a downshift is being performed, opens the sound quality values (or provides a command signal to another module, such as a fuel tank zone module or other actuator module, to open the sound quality valves 112) for a predetermined or calibratable period of time (e.g., until the downshift is completed), and then returns the vehicle to the current sound quality valve control scheme.

Figure 2:
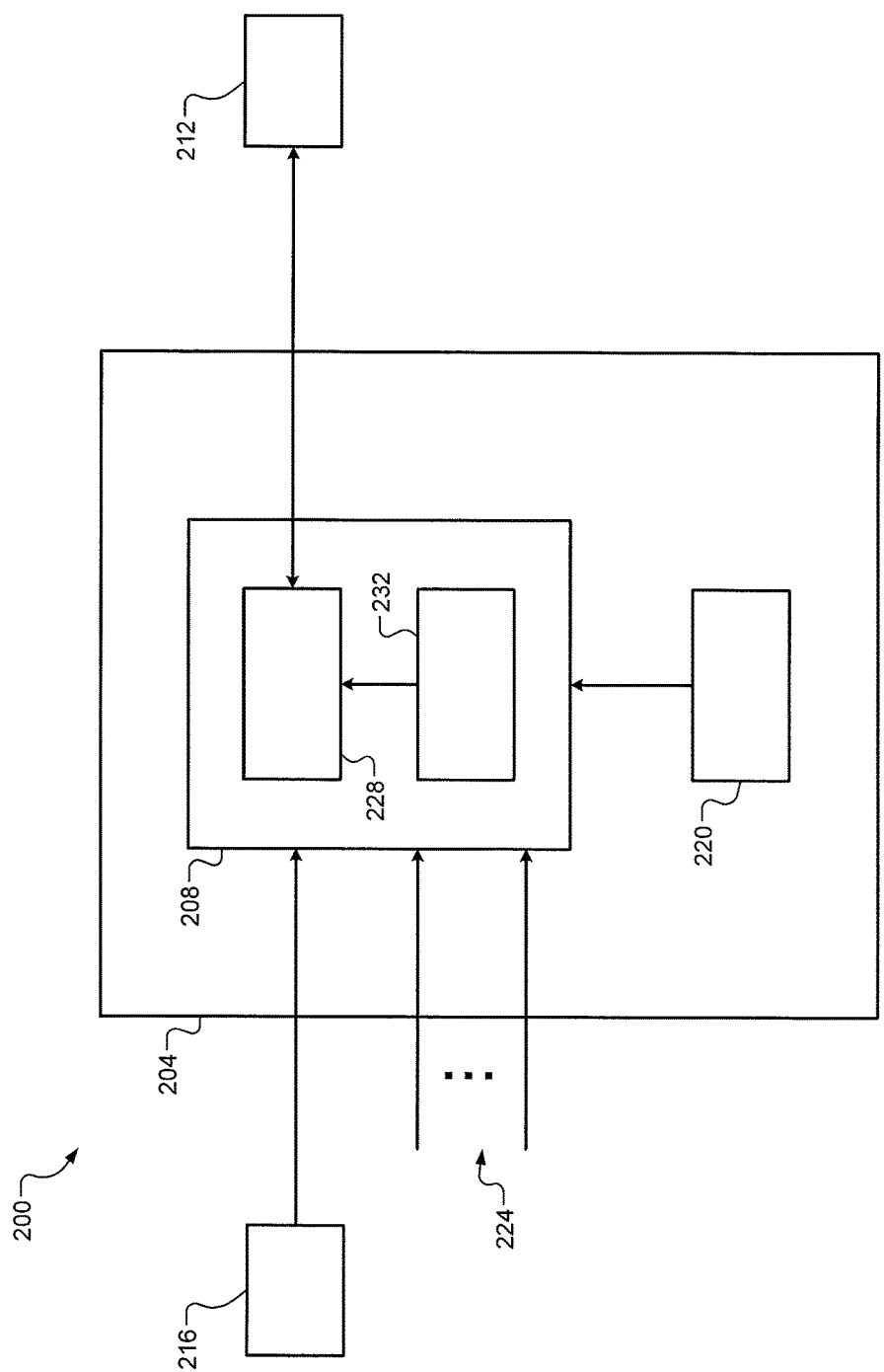
FIG. 2 is a functional block diagram of an example engine sound enhancement system according to the principles of the present disclosure.

Referring now to FIG. 2, an example engine sound enhancement system 200 according to the principles of the present disclosure is shown in more detail. An ECM 204 includes an ESE module 208 that selectively actuates sound quality valves 212 according to information received from a TCM 216 and/or an optional ESM module 220 and one or more other inputs 224 (which may originate from within or outside of the ECM 204). The received information and the inputs 224 include, but are not limited to, engine torque, vehicle speed, pedal position, pedal position rate of change, selected gear, shift direction (e.g., upshift or downshift), a current state of the sound quality valves 212 (i.e., open or closed), a selected performance mode (e.g., track, sport, economy, city, touring, stealth, etc.), an indication of whether engine speed matching is being performed, and/or user inputs.

The ESE module 208 includes a sound quality valve (SQV) control module 228 and a downshift detection module 232. The SQV control module 228 selectively actuates the sound quality valves 212 based on whether engine sound enhancement features are enabled, whether one or more whether for performing engine sound enhancement are met, whether a downshift is being performed, etc. For example, the SQV control module 228 may first determine whether engine sound enhancement features are enabled. Engine sound enhancement features may be disabled in certain vehicles, in certain vehicle faults are detected, in various selected performance modes, in response to user inputs, etc., and may be enabled in other selected performance modes, if engine speed matching is being performed, etc. For example only, the ESE module 208 may receive an indication from the ESM module 220 that engine speed matching is being performed. If engine sound enhancement is enabled, the SQV control module 228 may then determine whether one or more criteria for performing engine sound enhancement are met. For example, the criteria may include, but are not limited to, indications of whether engine torque, vehicle speed, pedal position, pedal position rate of change, the selected gear, etc. meet or exceed respective thresholds.

For example only, one or more of the criteria may generally be required to be met to open the sound quality valves 212 in certain performance modes. Accordingly, one or more of the criteria not being met (e.g., pedal position not meeting a threshold) may correspond to the sound quality valves 212 remaining closed despite other criteria for opening the valves 212 being met. For example, a pedal position threshold may not be met when engine speed matching is performed because the vehicle, not the pedal position, automatically causes the increase in engine speed. However, the SQV control module 228 may selectively open the sound quality valves 212 even if these criteria are not met in response to one or more aggressive driving indicators. In one example, the aggressive driving indicators may include a determination that engine speed matching is being performed (e.g., if a downshift is being performed and the ESM module 220 indicates that engine speed matching is being performed for the downshift, if the user is manually performing engine speed matching, etc.). For example, the downshift detection module 232 may determine whether engine speed matching is being performed and/or whether a downshift is being performed, and the SQV control module 228 opens the sound quality valves 212 in response to a determination that engine speed matching is being performed or was performed, and a downshift is being performed or was performed (i.e., the downshift is complete and the vehicle is accelerating accordingly). In other examples, the aggressive driving indicators correspond to operating parameters of automatic transmission and/or paddle shifted vehicles, including, but not limited to, transmission logic indicating aggressive driving (e.g., downshifting and transmission speeds), paddle shifting, pedal position rate of change, engine torque, fore/aft acceleration, lateral acceleration, network messages from the transmission indicating aggressive driving, etc. In some examples, the SQV control module 228 may also require that the vehicle is in a particular gear.

Figure 3:
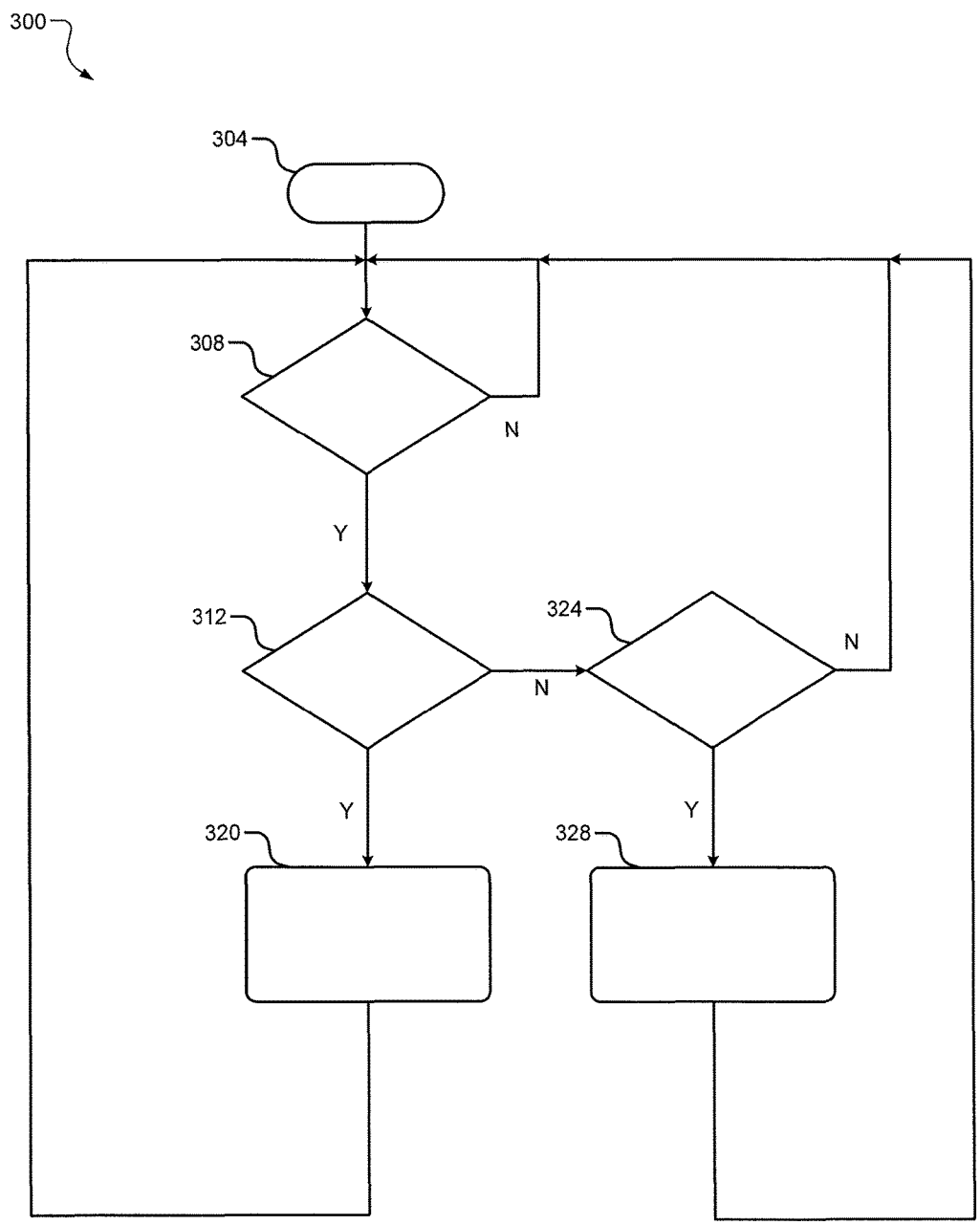
FIG. 3 illustrates an example engine sound enhancement method according to the principles of the present disclosure.

Referring now to FIG. 3, an example engine sound enhancement method 300 begins at 304. At 308, the method 300 (e.g., the ESE module 208) determines whether the sound quality valves are closed. If true, the method 300 continues to 312. If false, the method 300 continues to 308.

At 312, the method 300 (e.g., the ESE module 208) determines whether one or more criteria for performing engine sound enhancement are met. For example, the method 300 determines whether any criteria that are required for opening the sound quality valves 212 (e.g., pedal position) are met. If true, the method 300 continues to 320. If false, the method 300 continues to 324. At 320, the method 300 (e.g., the SQV control module 228) opens the sound quality valves 212 based on the one or more criteria and then continues to 308. For example only, steps 308, 312, and 320 may correspond to standard or default SQV logic for controlling the sound quality valves 212. Accordingly, the method 300 according to the principles of the present disclosure may bypass or override the standard SQV logic at 324.

At 324, the method 300 (e.g., the ESE module 208) determines whether aggressive driving behavior is detected. For example, the method 300 may receive one or more aggressive driving indicators including (in both manual and automatic transmission vehicles), but not limited to, an indication that engine speed matching and a downshift are being performed, indicators of pedal position rate of change, whether paddle shifting is being performed (e.g., in an automatic transmission vehicle that implements paddle shifting), engine torque, fore/aft acceleration, lateral acceleration, network messages from the transmission indicating aggressive driving, etc. If true, the method 300 continues to 328. If false, the method 300 continues to 308. At 328, the method 300 (e.g., the SQV control module 228) opens the sound quality valves 212 for a predetermined, calibratable, and/or variable period. For example, the period may be a fixed amount of time (i.e., predetermined or calibrated). Alternatively, the period may correspond to the engine speed matching, the downshift being performed, etc. For example, the period may expire when the engine speed matching and/or the downshift are complete, when the vehicle is no longer accelerating subsequent to the downshift being completed, when vehicle acceleration decreases below a threshold, when engine speed decreases below a threshold, etc. After the period expires, the method 300 continues to 308 and reverts to the standard SQV logic.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A system in a vehicle including at least one sound quality valve arranged in an exhaust system of the vehicle, the system comprising:
   a sound quality valve control module that (i) determines whether one or more criteria for opening the sound quality valve are met, (ii) selectively actuates the sound quality valve to an open position if the one or more criteria for opening the sound quality valve are met, and (iii) maintains the sound quality valve in a closed position if a required one of the one or more criteria for opening the sound quality valve is not met; and
   a downshift detection module that determines whether aggressive driving behavior is detected,
   wherein, if the aggressive driving behavior is detected, the sound quality valve control module actuates the sound quality valve to the open position regardless of whether the required one of the one or more criteria for opening the sound quality valve is met.

2. The system of claim 1, wherein, if the aggressive driving behavior is detected, the sound quality valve control module actuates the sound quality valve to the open position regardless of whether the sound quality valve is being maintained in the closed position.

3. The system of claim 1, wherein the downshift detection module determines whether the aggressive driving behavior is detected based on at least one aggressive driving indicator.

4. The system of claim 3, wherein the at least one aggressive driving indicator includes at least one of an indication of whether engine speed matching is being performed, an indication of whether a downshift is being performed, an indication of a pedal position rate of change, an indication of whether paddle shifting is being performed, engine torque, fore/aft acceleration, lateral acceleration, and network messages from a transmission of the vehicle indicating aggressive driving.

5. The system of claim 1, wherein, to actuate the sound quality valve to the open position regardless of whether the required one of the one or more criteria for opening the sound quality valve is met, the sound quality valve control module actuates the sound quality valve to the open position for a predetermined period.

6. The system of claim 1, wherein, to actuate the sound quality valve to the open position regardless of whether the required one of the one or more criteria for opening the sound quality valve is met, the sound quality valve control module actuates the sound quality valve to the open position for a first period, and wherein the first period is based on the detected aggressive driving behavior.

7. The system of claim 1, wherein, to actuate the sound quality valve to the open position regardless of whether the required one of the one or more criteria for opening the sound quality valve is met, the sound quality valve control module actuates the sound quality valve to the open position for a first period.

8. The system of claim 4, further comprising an engine speed matching module that determines when to perform the engine speed matching and provides an indication to the downshift detection module when the engine speed matching is being performed.

9. The system of claim 1, wherein the sound quality valve control module (i) determines a selected performance mode of the vehicle and (ii) selectively actuates the sound quality valve to the open position based on at least one of the selected performance mode and a selected gear.

10. A method of operating a vehicle including at least one sound quality valve arranged in an exhaust system of the vehicle, the method comprising:
    determining whether one or more criteria for opening the sound quality valve are met;
    selectively actuating the sound quality valve to an open position if the one or more criteria for opening the sound quality valve are met;
    maintaining the sound quality valve in a closed position if a required one of the one or more criteria for opening the sound quality valve is not met;
    determining whether aggressive driving behavior is detected; and
    wherein, if the aggressive driving behavior is detected, actuating the sound quality valve to the open position regardless of whether the required one of the one or more criteria for opening the sound quality valve is met.

11. The method of claim 10, wherein, if the aggressive driving behavior is detected, actuating the sound quality valve to the open position includes actuating the sound quality valve to the open position regardless of whether the sound quality valve is being maintained in the closed position.

12. The method of claim 10, further comprising determining whether the aggressive driving behavior is detected based on at least one aggressive driving indicator.

13. The method of claim 12, wherein the at least one aggressive driving indicator includes at least one of an indication of whether engine speed matching is being performed, an indication of whether a downshift is being performed, an indication of a pedal position rate of change, an indication of whether paddle shifting is being performed, engine torque, fore/aft acceleration, lateral acceleration, and network messages from a transmission of the vehicle indicating aggressive driving.

14. The method of claim 10, wherein actuating the sound quality valve to the open position regardless of whether the required one of the one or more criteria for opening the sound quality valve is met includes actuating the sound quality valve to the open position for a predetermined period.

15. The method of claim 10, wherein actuating the sound quality valve to the open position regardless of whether the required one of the one or more criteria for opening the sound quality valve is met includes actuating the sound quality valve to the open position for a first period, and wherein the first period is based on the detected aggressive driving behavior.

16. The method of claim 10, wherein actuating the sound quality valve to the open position regardless of whether the required one of the one or more criteria for opening the sound quality valve is met includes actuating the sound quality valve to the open position for a first period.

17. The method of claim 13, further comprising determining when to perform the engine speed matching and providing an indication of when the engine speed matching is being performed.

18. The method of claim 10, further comprising determining a selected performance mode of the vehicle and selectively actuating the sound quality valve to the open position based on at least one of the selected performance mode and a selected gear.

* * * * *